United States Patent
Piccininno et al.

(10) Patent No.: US 9,463,937 B2
(45) Date of Patent: Oct. 11, 2016

(54) STAND FOR STORING AND/OR TRANSPORTING GLASS PANELS OF LARGE DIMENSIONS

(71) Applicant: AGC Glass Europe, Louvain-la-Neuve (BE)

(72) Inventors: Michel Piccininno, Erpent (BE); Jean-Charles Careme, Edegem (BE); Harold Cruysmans, Brussels (BE); Valeriano Zuccarini, Virton (BE)

(73) Assignee: AGC GLASS EUROPE, Louvain-la-Neuve (BE)

( * ) Notice: Subject to any disclaimer, the term of this patent is extended or adjusted under 35 U.S.C. 154(b) by 0 days.

(21) Appl. No.: 14/400,423

(22) PCT Filed: May 7, 2013

(86) PCT No.: PCT/EP2013/001348
§ 371 (c)(1),
(2) Date: Nov. 11, 2014

(87) PCT Pub. No.: WO2013/167263
PCT Pub. Date: Nov. 14, 2013

(65) Prior Publication Data
US 2015/0136716 A1 May 21, 2015

(30) Foreign Application Priority Data

May 11, 2012 (BE) .................... 2012/0317

(51) Int. Cl.
*A47B 43/00* (2006.01)
*B65G 49/06* (2006.01)
(Continued)

(52) U.S. Cl.
CPC ......... *B65G 49/062* (2013.01); *B65D 21/0204* (2013.01); *B65D 85/48* (2013.01); *D06F 57/08* (2013.01)

(58) Field of Classification Search
CPC  B65G 49/062; B65D 21/0204; B65D 85/48; D06F 57/08
USPC ............. 211/198, 41.1, 41.14; 248/500, 505, 248/518, 523; 220/23.2, 23.4; 206/454, 206/451, 449, 386; 108/56.1
See application file for complete search history.

(56) References Cited

U.S. PATENT DOCUMENTS 862,104 A * 7/1907 Rauschenbusch ............ 211/198
1,213,032 A * 1/1917 Smith .......................... 414/787
(Continued)

FOREIGN PATENT DOCUMENTS

AU   2010 200 919   9/2010
BE   664 531        9/1965
(Continued)

OTHER PUBLICATIONS

International Search Report Issued Oct. 15, 2013 in PCT/EP13/001348 Filed May 7, 2013.

*Primary Examiner* — Joshua J Michener
*Assistant Examiner* — Devin Barnett
(74) *Attorney, Agent, or Firm* — Oblon, McClelland, Maier & Neustadt, L.L.P

(57) ABSTRACT

A stand for storing and/or transporting glass panels of large dimensions including a horizontal support structure and at least one support frame provided to support the glass panels. The stand comprises at least one securing device for securing the stand to another stand.

7 Claims, 2 Drawing Sheets

(51) Int. Cl.
  *B65D 21/02*   (2006.01)
  *B65D 85/48*   (2006.01)
  *D06F 57/08*   (2006.01)

(56) References Cited

U.S. PATENT DOCUMENTS

| | | | | |
|---|---|---|---|---|
| 2,839,198 | A * | 6/1958 | Lefevre | 211/41.14 |
| 2,863,566 | A * | 12/1958 | White et al. | 211/41.14 |
| 3,131,829 | A * | 5/1964 | Masser | 206/144 |
| 3,446,462 | A * | 5/1969 | Brenia | 410/77 |
| 3,596,755 | A * | 8/1971 | Bundy et al. | 206/452 |
| 3,602,157 | A * | 8/1971 | Cohen et al. | 108/57.18 |
| 3,606,023 | A * | 9/1971 | Edmunds | 211/74 |
| 3,851,937 | A * | 12/1974 | Winston | 312/111 |
| 3,887,078 | A * | 6/1975 | Jay | 211/50 |
| 3,955,676 | A * | 5/1976 | Hansen et al. | 206/451 |
| 4,033,459 | A * | 7/1977 | Zach | 211/20 |
| 4,043,477 | A * | 8/1977 | Deese | 220/23.4 |
| 4,062,301 | A * | 12/1977 | Pitchford | 108/56.1 |
| 4,095,769 | A | 6/1978 | Fengels | |
| 4,099,626 | A * | 7/1978 | Magnussen, Jr. | 211/60.1 |
| D251,281 | S * | 3/1979 | Magnussen, Jr. | D6/675 |
| 4,304,336 | A * | 12/1981 | Mays | 211/41.14 |
| 4,567,989 | A * | 2/1986 | Hurst, Jr. | 211/74 |
| 4,688,976 | A * | 8/1987 | Rowley et al. | 410/156 |
| 5,024,067 | A * | 6/1991 | Maier, II | 62/457.4 |
| 5,085,329 | A * | 2/1992 | Crowell et al. | 211/195 |
| 5,148,924 | A * | 9/1992 | Mason et al. | 211/41.14 |
| 5,199,589 | A * | 4/1993 | Noble | 220/7 |
| 5,584,399 | A * | 12/1996 | King | 211/41.15 |
| 5,676,067 | A * | 10/1997 | Breindel | 108/56.1 |
| 5,755,339 | A * | 5/1998 | Belanger et al. | 211/41.14 |
| D403,880 | S * | 1/1999 | Malik | D6/681.1 |
| 5,906,282 | A * | 5/1999 | Aldrich et al. | 211/41.14 |
| 5,915,570 | A | 6/1999 | Orsini | |
| 6,044,990 | A * | 4/2000 | Palmeri | 211/189 |
| 6,170,675 | B1 * | 1/2001 | Follman et al. | 211/41.1 |
| 6,360,884 | B1 * | 3/2002 | Smith et al. | 206/209.1 |
| 6,386,376 | B1 * | 5/2002 | Mendoza-Castillo et al. | 211/41.14 |
| 6,450,514 | B1 * | 9/2002 | Ronca | 280/79.11 |
| 6,502,711 | B1 * | 1/2003 | Mc Rae | 220/23.4 |
| 6,510,950 | B1 | 1/2003 | Piazza | |
| 7,185,770 | B1 * | 3/2007 | Roten | 211/70.6 |
| 7,264,126 | B1 * | 9/2007 | Bergeron | 211/41.14 |
| 7,641,059 | B2 * | 1/2010 | Gracia Lecina | 211/85.22 |
| 8,109,393 | B2 * | 2/2012 | Haeberlein | 211/41.14 |
| 8,342,544 | B1 * | 1/2013 | Blewett et al. | 280/79.11 |
| 8,376,291 | B1 * | 2/2013 | Groves | 248/166 |
| 8,701,570 | B2 * | 4/2014 | Wilson et al. | 108/56.1 |
| 8,789,710 | B1 * | 7/2014 | Moore et al. | 211/41.14 |
| 8,967,943 | B2 * | 3/2015 | Drott et al. | 414/809 |
| 2002/0088766 | A1 * | 7/2002 | Flores | 211/194 |
| 2003/0173314 | A1 * | 9/2003 | Knoll et al. | 211/41.14 |
| 2003/0196971 | A1 * | 10/2003 | Jeskey et al. | 211/41.14 |
| 2006/0013666 | A1 * | 1/2006 | Halliar | 410/77 |
| 2006/0091096 | A1 * | 5/2006 | Velez et al. | 211/194 |
| 2007/0266911 | A1 * | 11/2007 | Lee | 108/64 |
| 2007/0283857 | A1 * | 12/2007 | Dong | 108/51.11 |
| 2008/0006596 | A1 * | 1/2008 | Palmeri | 211/189 |
| 2008/0237159 | A1 * | 10/2008 | Bray et al. | 211/59.2 |
| 2008/0283481 | A1 * | 11/2008 | Evans et al. | 211/74 |
| 2011/0186533 | A1 * | 8/2011 | Thrush et al. | 211/113 |
| 2011/0253656 | A1 * | 10/2011 | Vermeer | 211/85.8 |
| 2012/0007343 | A1 * | 1/2012 | Webster et al. | 280/659 |
| 2012/0262040 | A1 * | 10/2012 | Karpovich et al. | 312/293.3 |
| 2014/0360120 | A1 * | 12/2014 | Brisendine et al. | 52/582.1 |

FOREIGN PATENT DOCUMENTS

| | | |
|---|---|---|
| DE | 23 18 159 | 11/1974 |
| DE | 20 2006 016 590 | 2/2007 |
| FR | 2 955 839 | 8/2011 |

* cited by examiner

STAND FOR STORING AND/OR TRANSPORTING GLASS PANELS OF LARGE DIMENSIONS

1. FIELD OF THE INVENTION

The invention relates to a stand for storing and/or transporting large glass panels. More particularly, the invention relates to a stand for storing and/or transporting PLF or DLF glass panels.

The invention relates to the general technical field of handling, processing and transport of freight.

2. SOLUTIONS OF THE PRIOR ART

Presently, in order to transport large glass panels, road transport, for example simply by truck, or multimodal transport combining the use of a truck and a train are used. When these large panels are transported by inland waterways, they are transported in containers. Unfortunately, these types of transport do not make it possible to transport large numbers of large panels in a single voyage or a single shipment. For example, in road transport, a truck can transport only one stand comprising large panels. In the case of trains and inland waterways, given the size of the stand supporting the load of the large glass panels, only one device at a time may be arranged in a container, which limits the number of large panels which may be transported.

Thus, for transporting large numbers of large glass panels, several trucks or several containers must be used, which leads to high transport costs and high $CO_2$ emissions, since the same number of trucks or containers have to return empty as the supports cannot be dismantled and/or collapsed. This applies to road transport, for example just by truck, as well as to multimodal transport combining the use of a truck and a train.

Such a situation can be seen for example in the case of transporting PLF (Plateau Largeur de Fabrication) or DLF (Découpe Largeur de Fabrication) glass panels, which requires particular supports of the stand type, ensuring that the panels are immobilized and stable when stored or transported from point A to point B, or from the manufacturer to the client.

Transport and empty returns are thus problematic in both economic and environmental terms.

3. OBJECTIVES OF THE INVENTION

In particular, it is an objective of the invention to remedy the drawbacks of the prior art.

More precisely, one objective of the invention, in at least one of the embodiments thereof, is to provide a versatile stand for storing and/or transporting large glass panels.

More precisely, one objective of the invention, in at least one of the embodiments thereof, is to provide a stand by means of which it is possible to store and transport large panels by road, rail and sea.

Another objective of the invention, in at least one of the embodiments thereof, is to provide a stand for storing and/or transporting large glass panels, by means of which it is possible to ship large panels by road, rail and sea while responding to the constraints of the equipment of production lines of said panels.

It is also the objective of the invention, in at least one of the embodiments thereof, to provide a fully collapsible stand for storing and/or transporting large glass panels.

Another objective of the invention, in at least one of the embodiments thereof, is to provide a stand for storing and/or transporting large glass panels, by means of which it is possible to transport, in a single step, a large number of large panels while reducing transport costs and $CO_2$ emissions.

4. DISCLOSURE OF THE INVENTION

In accordance with one particular embodiment, the invention relates to a stand for storing and/or transporting large glass panels, said stand comprising a horizontal support structure and at least one supporting frame designed to support said panels.

According to the invention, such a stand comprises at least one means for fastening said stand to another stand.

The general principle of the invention is based on a stand comprising a versatile self-supporting structure for storing and/or transporting large glass panels, and in particular PLF (Plateau Largeur de Fabrication) glass panels, by road, rail and sea, while responding to the constraints of the equipment of production lines.

The invention is therefore based on an entirely novel and inventive approach based on the use of at least one fastening means to connect one stand to another stand for storing and/or transporting large glass panels in order to fasten the whole assembly while ensuring that the structure comprising at least two stands according to the invention is stable during transport.

Thus, several stands stocked with large glass panels, and in particular PLF glass panels, may be placed for example in the hold of a ship while ensuring that the structure is very stable (200 to 300 stands per voyage). The load is thus better spread over the various stands. The number of large glass panels which can be transported in a single voyage or a single shipment is thus substantially increased, while reducing both the cost connected with transport and the environmental impact by reducing the rate of $CO_2$ emission.

According to one exemplary embodiment of the stand in accordance with the invention, the fastening means is fastened to the horizontal support structure.

According to another exemplary embodiment of the stand in accordance with the invention, the fastening means is fastened to at least one of the ends of the horizontal support structure.

According to one exemplary embodiment of the stand in accordance with the invention, the fastening means comprises a male part designed to slot into a female part of the fastening means of the other stand.

Thus, the female part of a first fastening means on a first stand according to the invention is introduced/slotted into the male part of a second fastening means on another stand. The two stands are then connected to one another which increases the stability of the structure since the base-to-height ratio is increased.

According to one exemplary embodiment of the stand in accordance with the invention, the fastening element comprises a system for locking the male part to the female part of the other fastening element.

Thus, the fastening between a stand according to the invention and another stand is secured and/or strengthened. The risk of a stand unfastening itself from another stand is then considerably reduced or even eliminated.

According to one exemplary embodiment of the stand in accordance with the invention, the fastening element is elongate and is shorter than or the same length as the width of the horizontal support structure.

Thus, the fastening element can be slid from the platform of a stand toward the horizontal support structure of another stand so as to create and strengthen the structure comprising at least two stands in accordance with the invention.

According to one exemplary embodiment of the stand in accordance with the invention, the horizontal support structure comprises at least one guiding element in order to facilitate the positioning and juxtaposition of a stand in accordance with the invention close to another stand adjacent to the first stand in order to form a fast and uniform structure.

Thus, a stand may be connected very quickly and securely to at least one other stand, said stands being stocked with large glass panels.

According to one embodiment which is preferred or in accordance with the invention, the stand is collapsible.

Thus, the costs associated with the empty return of the devices in accordance with the invention are considerably reduced.

According to one advantageous embodiment of the invention, the large panels shipped on the stand are PLF (Plateau Largeur de Fabrication) or DLF (Découpe Largeur de Fabrication) panels.

The invention also relates to a structure comprising stands as described above.

The invention also relates to the use of at least one stand according to the invention for maritime transport of large glass panels, in particular in the hold of a ship.

The advantages of the structure comprising stands according to the invention, and the use thereof for maritime transport, are the same as those of the stands; they are not described in more detail.

5. LIST OF FIGURES

Other features and advantages of the invention will emerge more clearly upon reading the following description of a preferred embodiment, given solely as an illustrative and non-limiting example, and the appended drawings, in which.

6. DESCRIPTION OF AT LEAST ONE EMBODIMENT OF THE INVENTION

Structurally and functionally identical elements which appear on several different figures are assigned a single reference number.

Figure 1:
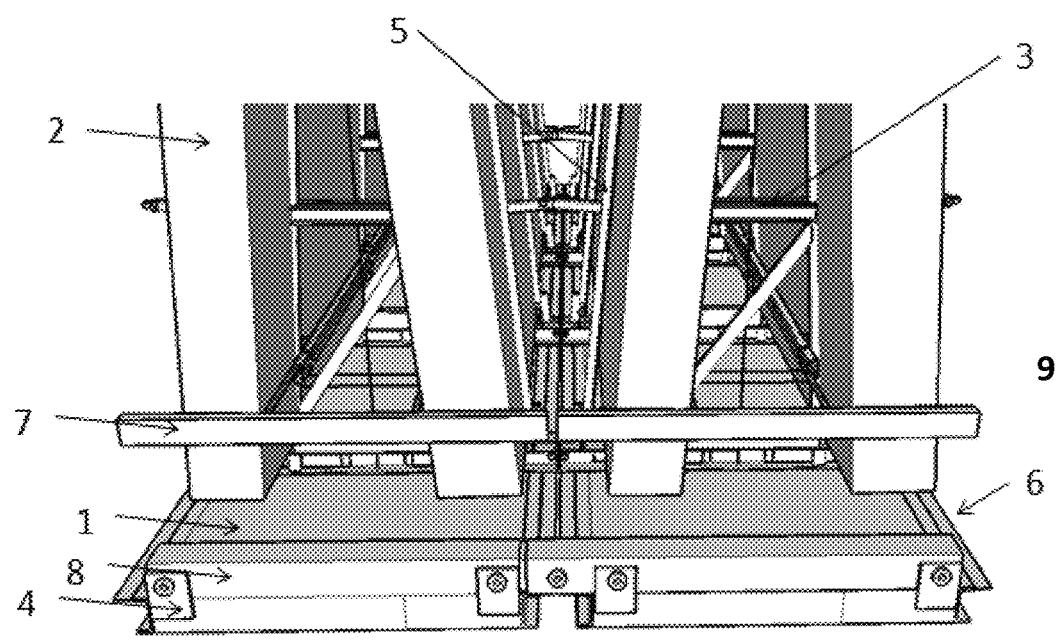
FIG. 1 shows, schematically and in a front view, an exemplary embodiment of a structure comprising two stands for storing and/or transporting large glass panels, which are fastened by means of two fastening means.
Figure 2:
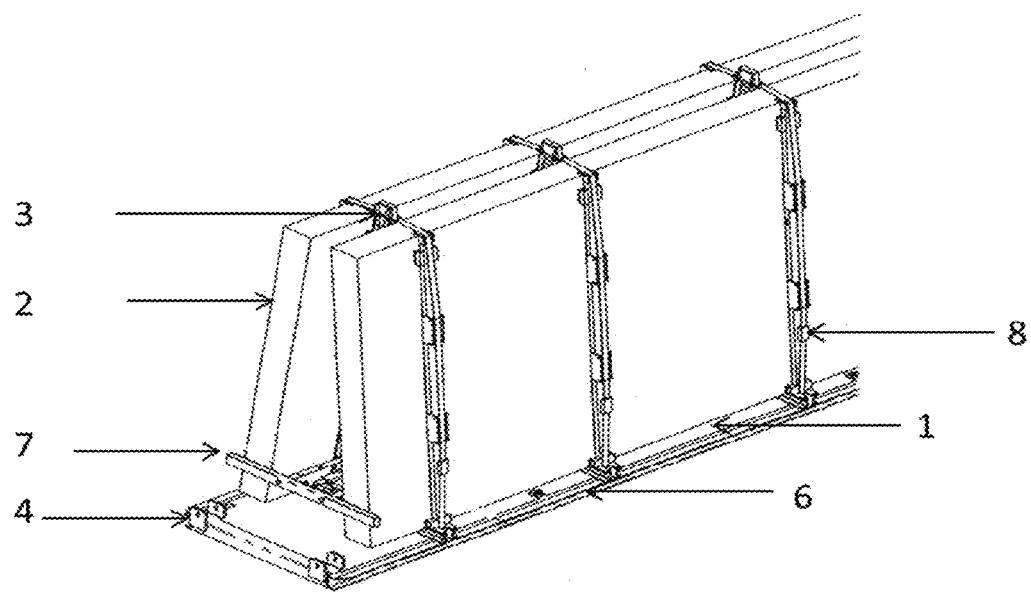
FIG. 2 shows, schematically and in a side view, an exemplary embodiment of a stand for storing and/or transporting large glass panels.
Figure 3:
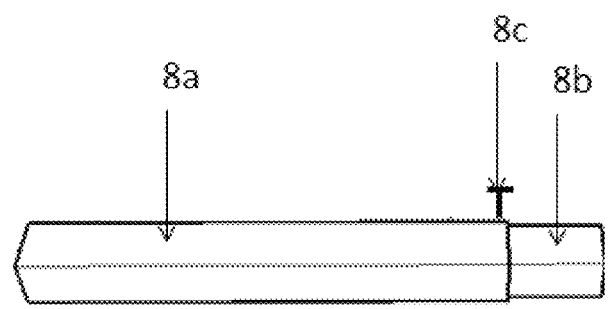
FIG. 3 shows, schematically and in a front view, the exemplary embodiment of a fastening means.
Figure 4:
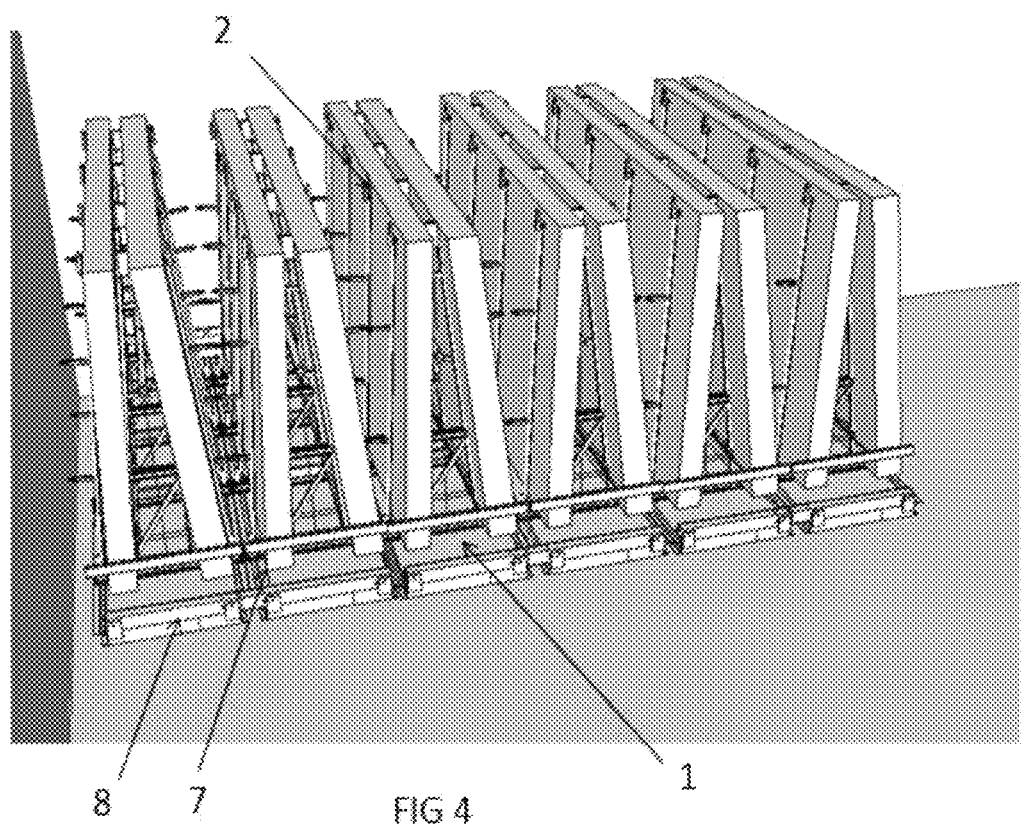
FIG. 4 shows, schematically and in a side view, a structure comprising several stands of FIG. 2.

The stand for storing and/or transporting large glass panels in accordance with the invention and represented for example in FIGS. 1 to 3 comprises a horizontal support structure 1. The length of the horizontal support structure is, for example, the same as that of the large glass panels 2 to be transported, and the width of this structure is sufficient to support the load of the glass panels 2 and in particular PLF or DLF glass panels. The dimensions of the horizontal support structure according to the invention allow it to be introduced into a truck specially designed for transporting large glass panels, into a container in the case of transport by land, rail, inland waterway and directly without being introduced into a container in an adequate means of transport such as directly into the hold of a ship. The horizontal support structure is for example over 6000 mm long and 1500 mm wide. The horizontal support structure is preferably 6934 mm long and 1530 mm wide.

Glass is to be understood as all types of glass and equivalent transparent materials such as mineral glasses and organic glasses. The mineral glass may equally consist of one or more known types of glass such as soda-lime glasses, borate glasses, crystalline and semi-crystalline glasses. The organic glass may be a rigid transparent thermoset or thermoplastic polymer or copolymer such as a transparent synthetic polycarbonate, polyester or polyvinyl resin. Of course, the large glass panel may be flat or curved (for example a domed glass panel).

The horizontal support structure 1 may be made entirely or partly of a material chosen from: steel, plastic and wood. The horizontal support structure is preferably made of steel.

According to the invention, at least one supporting frame 3 provided for supporting large glass panels 2 is fastened to the horizontal support structure 1. The supporting frame 3 may in particular be a horizontal structure extending along the large glass panels 2 to be stored/transported. It is understood that such a frame 3 must be large enough to support the load of the large glass panels 2. The supporting frame may in particular have the same dimensions as the large glass panels. According to one preferred embodiment of the invention, the large glass panels are PLF or DLF glass panels. "PLF" designates glass panels which are 6 m long by 3.21 m wide; "DLF" designates panels which are 3.21 m wide but at most 2.25 m long.

According to one particular embodiment of the invention, at least two supporting frames 3 provided for supporting large glass panels are fastened to the horizontal support structure. The frames are then arranged, fastened to the horizontal support structure, at distances from one another making it possible to support the load of the large glass panels 2. The supporting frames are preferably A-frames.

According to one preferred embodiment of the invention, four supporting frames 3 provided for supporting large glass panels 2 are fastened to the horizontal support structure 1. The supporting frames 3 are arranged such that the load of the large glass panels is spread correctly between the supporting frames. The supporting frames are preferably A-frames. Advantageously, the supporting frames 3 are positioned, attached at 140 mm intervals along the horizontal support structure 1. The supporting frames 3 and in particular A-frames are preferably made entirely or partly of a material such as steel and have the following dimensions: 4950 mm×1520 mm×3400 mm.

In accordance with the invention, the A-frames have, on each side, a supporting face which is substantially inclined and is designed to act as a support for the glass panels 2, for example of the PLF type, as is shown in FIGS. 1 to 4. The supporting face is substantially orthogonal to the inclined supporting plane.

These frames 3 have an angle of inclination by means of which it is possible to support the large glass panels 2 in a semi-vertical position.

It is thus possible to place 71 large glass panels 2 on either side of the supporting frames 3 and in particular of the A-shaped supporting frames, i.e. a total of 142 panels representing a total weight of 26 tonnes. The stand according to the invention thus makes it possible to store and/or transport a large load of large glass panels.

Advantageously, the A-frames 3 are connected to one another by crosspieces 5. For example, three crosspieces 5 may be used to connect the A-frames 3 to one another. According to one particular embodiment of the invention, the stand may comprise an additional longitudinal or transverse lower crosspiece with a latching system by means of which it is possible to strengthen the stand. The crosspieces 5 may be made of a material chosen from: steel, wood or plastic. The crosspieces are preferably made of a material such as steel and are in the form of a tube or a girder.

According to one particular form of the invention, the supporting frames 3 are collapsible. This has the advantage that, after the large glass panels have been unloaded, the supporting frames 3 are dismantled and can be transported very easily in a container, thus reducing the cost of empty returns.

Advantageously, the A-frames 3 have, in their upper part, a strengthened portion allowing the stand to be held using a spreader provided for that purpose. The stand according to the invention can thus be lifted and therefore moved from point A to point B, for example using a crane.

According to one particular form of the invention, the horizontal support structure 1 has means on its lower face by means of which the stand can be lifted using a lower socket by means of the forks of a forklift truck.

According to the invention, the stand for storing and/or transporting large glass panels 2 comprises at least one fastening means 8 by means of which said stand can be fastened to another stand. In a preferred manner, the fastening means 8 is fastened to the horizontal support structure 1.

Advantageously, the fastening means 8 is fastened to at least one of the ends of the horizontal support structure 1. According to one particular embodiment of the invention, the fastening means 8 is elongate and is shorter than or the same length as the width of the horizontal support structure 1. For example, the fastening means 8 is in the form of a tube or a bar which is shorter than or the same length as the width of the horizontal support structure 1, and which is wide enough to withstand the friction between two stands connected to one another. A fastening means according to the invention is 1520 mm long and 140 mm wide.

It is understood that the fastening means 8 may have various sizes and shapes. The fastening means 8 must make it possible to stabilize the structure comprising at least one stand connected to another stand. Indeed, the fastening means 8 which fastens one stand to another stand makes it possible to increase the base-to-height ratio and thus improve the stability of the structure comprising at least two stands connected to one another by the fastening means 8 according to the invention while transporting the large glass panels 2.

According to one particular embodiment of the invention, the fastening means 8 comprises a male part 8*a* designed to slot into a female part 8*b* of the fastening means of another stand. According to one embodiment in accordance with the invention, the shape of the male part of a first fastening means allows it to fit and to be slotted easily into the female part of another fastening means arranged on another stand adjacent thereto. Indeed, the first fastening means 8, by slotting into another fastening means positioned on another stand adjacent to the first stand, thus makes it possible to connect/fasten the two stands to one another, thus increasing the stability of the assembly. The assembly, comprising at least two stands in accordance with the invention, can thus be transported securely even if it is not placed in a container.

Such a fastening means 8 is represented in particular in FIG. 3. According to one preferred form of the invention, the fastening means 8 is located at each end of the horizontal support structure.

According to one embodiment in accordance with the invention, the fastening means 8 comprises a locking system by means of which the male part 8*a* of the fastening means arranged on the horizontal support structure 1 of one stand can be locked to the female part 8*b* of another fastening means 8 arranged on the horizontal support structure 1 of another stand. Thus, this locking system makes it possible to keep severalstands fastened to one another during transport inspite of the motion caused by the mode of transport,thus avoiding the various stands transported in asingle shipment, for example in the hold of a ship, coming loose from one another and knocking against one another, which would result in breakages. The locking system can for example take the form of a pin 8*c*.

Advantageously, the fastening means 8 comprises a gripping means which thus facilitates the handling and positioning of said fastening means. The gripping means may take the form of an inverted U positioned on the upper face of said gripping means.

According to one variant in accordance with the invention, the horizontal support structure 1 may comprise at least one positioning member 4 to make it easier to introduce and slide the male part 8*a* of the fastening means of one stand into the female part 8*b* of another fastening means on the stand adjacent to said stand. The positioning member may for example take the form of an inverted U—made of steel—fastened to the horizontal support structure 1. Of course, any positioning member able to fulfill this role may be used. The shape and size of the positioning member 4 will depend on the shape and size of the fastening means 8. One example of a positioning member 4 according to the invention is in particular shown in FIGS. 1 and 2.

According to one particular form of the invention, the horizontal support structure 1 may comprise at least one guiding element 6. In a preferred manner, the guiding element 6 is located along the horizontal support structure 1 and on either side of said horizontal structure 1. The guiding element 6 makes it possible, in particular, to correctly position and juxtapose a stand in accordance with the invention close to another stand such that they form a fast and uniform structure. In particular, the guiding element 6 makes it possible to hold the stands in position while transporting the large glass panels 2. The guiding element 6 may for example take the form of a gutter into which the guiding element located on the horizontal support part 1 of another stand is going to slide and slot. Of course, any guiding means 6 able to fulfill this role may be used. One example of a guiding means 6 is in particular shown in FIGS. 1 and 2.

In order to protect the large glass panels 2 during transport using the stand according to the invention, said stand is equipped with various accessories such as rubber corners, holding straps 8, a system for adjusting the inclination of the crosspieces (not shown), etc.

Advantageously, the glass panels 2 are immobilized on the stand by means of at least one wedge 7 positioned on either side of the large glass panels. The wedge 7 extends over the width of the horizontal support structure 1. The wedge 7 is preferably mounted on the supporting frame 3. Such a configuration is for example shown in FIGS. 1 and 2. According to one particular form of the invention, the wedge 7 may take the form of a bar or a girder made of a material such as steel. The wedge 7 is preferably at least as long as the horizontal support structure is wide.

According to one variant in accordance with the invention, the supporting frames 3 for supporting the glass panels 2, the crosspieces 5 and the fastening means are collapsible. Thus, the stands can be returned empty in containers such as truck containers or containers intended for rail transport or transport by inland waterway, thus reducing the cost of returning the empty stands.

Thus, the stand according to the invention for securely storing and/or transporting large glass panels makes it possible to reduce the cost of transporting these. The conditions for transporting a large number of large glass panels are thus optimized and secured.

In particular, a person skilled in the art will be able to vary both the shape of the supporting frames for the large glass panels to be stored and/or transported, and the number of crosspieces 5 used to strengthen the stand in accordance with the invention.

In addition, the shape of the fastening means 8 is not restricted to an elongate fastening means.

The invention also relates to storing and/or transporting large panels made of a material other than glass.

The invention claimed is:

1. A stand for at least one of storing and transporting glass panels, said stand comprising:
a horizontal support structure; at least one generally A-shaped supporting frame designed to support said panels in generally upright positions; and at least one first fastening mechanism to fasten said stand to another stand, wherein the horizontal support structure of said stand is fastened to the horizontal support structure of said another stand in a laterally juxtaposed manner by the first fastening mechanism;
wherein the first fastening mechanism is fastened adjacent a transverse edge of an end of the horizontal support structure;
wherein the first fastening mechanism comprises a male part that projects from the stand and is designed to slot into a female part of a second fastening mechanism of the another stand; and
wherein the first fastening mechanism comprises a system to lock said male part in said female part; wherein the first fastening mechanism comprises a unitary member having a male end and a female end; wherein the first and second fastening mechanism are identical.

2. The stand as claimed in claim 1, wherein the first fastening mechanism is elongate and is shorter than or the same length as a width of the horizontal support structure.

3. The stand as claimed in claim 1, wherein the horizontal support structure comprises at least one guiding element in order to facilitate fastening the stand to the another stand, the at least one guiding element formed along one of longitudinal edges of the horizontal support structure.

4. The stand as claimed in claim 1, wherein, when in use, the panels are PLF or DLF glass panels.

5. The stand according to claim 1 for use in maritime transport of glass panels.

6. The stand as claimed in claim 1, wherein a base-to-height ratio of a plurality of the stands is adjustable by the first fastening mechanism.

7. The stand for glass panels according to claim 1, wherein the first fastening mechanism is attached to a top surface of the horizontal support structure.

\* \* \* \* \*